United States Patent
Linney et al.

(10) Patent No.: US 9,880,032 B1
(45) Date of Patent: Jan. 30, 2018

(54) MODULAR REMOVABLE FLOW METERING ASSEMBLY WITH CONE SHAPED DIFFERENTIAL PRESSURE PRODUCER IN A COMPACT FLUID CONDUIT

(71) Applicants: Johnathan W. Linney, Kingwood, TX (US); Michael Bibb, Kingwood, TX (US)

(72) Inventors: Johnathan W. Linney, Kingwood, TX (US); Michael Bibb, Kingwood, TX (US)

(*) Notice: Subject to any disclaimer, the term of this patent is extended or adjusted under 35 U.S.C. 154(b) by 0 days.

(21) Appl. No.: 15/628,125

(22) Filed: Jun. 20, 2017

(51) Int. Cl.
| | | |
|---|---|---|
| *G01F 1/36* | (2006.01) | |
| *G01F 1/37* | (2006.01) | |
| *G01F 5/00* | (2006.01) | |
| *G01F 1/40* | (2006.01) | |
| *G01F 1/52* | (2006.01) | |
| *G01F 1/42* | (2006.01) | |

(52) U.S. Cl.
CPC ............ *G01F 1/37* (2013.01); *G01F 1/40* (2013.01); *G01F 5/005* (2013.01); *G01F 1/42* (2013.01); *G01F 1/52* (2013.01)

(58) Field of Classification Search
None
See application file for complete search history.

(56) References Cited

U.S. PATENT DOCUMENTS

| | | | | | |
|---|---|---|---|---|---|
| 3,646,811 | A | * | 3/1972 | DeLeo | G01P 5/14 73/861.65 |
| 4,320,665 | A | * | 3/1982 | Cain | G01F 1/74 73/861.65 |
| 4,545,260 | A | * | 10/1985 | Benton | G01F 1/74 73/861.65 |
| 4,559,835 | A | * | 12/1985 | DeBaun | G01F 1/46 73/861.66 |
| 4,624,146 | A | * | 11/1986 | Nakagawa | G01F 1/46 73/861.66 |
| 4,677,858 | A | * | 7/1987 | Ohnhaus | G01P 5/165 73/861.65 |
| 5,036,711 | A | * | 8/1991 | Good | G01F 1/46 73/861.66 |
| 5,123,288 | A | * | 6/1992 | Tench | G01P 5/165 73/861.66 |
| 7,293,471 | B2 | * | 11/2007 | Lund Bo | G01F 1/40 73/861.65 |

(Continued)

*Primary Examiner* — Harshad R Patel
(74) *Attorney, Agent, or Firm* — Buskop Law Group, P.C.; Wendy Buskop

(57) ABSTRACT

A modular removable flow metering assembly for a unidirectional fluid channel having three variations. Each embodiment can use a compact fluid conduit for connecting an upstream fluid flow to a downstream fluid flow. An embodiment uses a unitary dual measurement container having an upstream port opening opposite to a downstream port. The upstream port communicates with an upstream fluid channel with an upstream pressure. The downstream port communicates with a downstream fluid channel having a downstream pressure. A cone shaped differential pressure producer with a flared discharge end is in fluid communication with the downstream fluid channel. A manifold can fluidly connect the upstream and downstream fluid channels, and a customer connection device can receive the upstream pressure and downstream pressure.

9 Claims, 7 Drawing Sheets

(56) References Cited

U.S. PATENT DOCUMENTS

| | | | |
|---|---|---|---|
| 7,478,565 B2* | 1/2009 | Young | G01F 1/36 |
| | | | 73/861.65 |
| 9,435,199 B1* | 9/2016 | Halilah | G01L 7/00 |
| 2003/0188586 A1* | 10/2003 | Orleskie | G01F 1/34 |
| | | | 73/861.61 |
| 2007/0163362 A1* | 7/2007 | Wehrs | G01F 1/34 |
| | | | 73/861.42 |
| 2007/0193369 A1* | 8/2007 | Evans | G01F 1/34 |
| | | | 73/861.52 |
| 2008/0016968 A1* | 1/2008 | McCall | G01F 1/40 |
| | | | 73/861.52 |
| 2008/0307896 A1* | 12/2008 | Ifft | G01F 1/42 |
| | | | 73/861.61 |
| 2009/0165566 A1* | 7/2009 | Peters | G01F 1/40 |
| | | | 73/861.55 |
| 2010/0224009 A1* | 9/2010 | Steven | G01F 1/3218 |
| | | | 73/861.42 |
| 2011/0138929 A1* | 6/2011 | Young | G01F 1/40 |
| | | | 73/861.42 |
| 2011/0259119 A1* | 10/2011 | Steven | G01F 1/363 |
| | | | 73/861.42 |
| 2012/0096949 A1* | 4/2012 | Lawrence | G01F 1/40 |
| | | | 73/861.65 |
| 2012/0180547 A1* | 7/2012 | Lawrence | G01F 1/40 |
| | | | 73/861.42 |
| 2014/0069208 A1* | 3/2014 | Ayers | G01F 1/36 |
| | | | 73/861.42 |
| 2014/0260658 A1* | 9/2014 | Strom | G01F 1/3218 |
| | | | 73/861.01 |

* cited by examiner

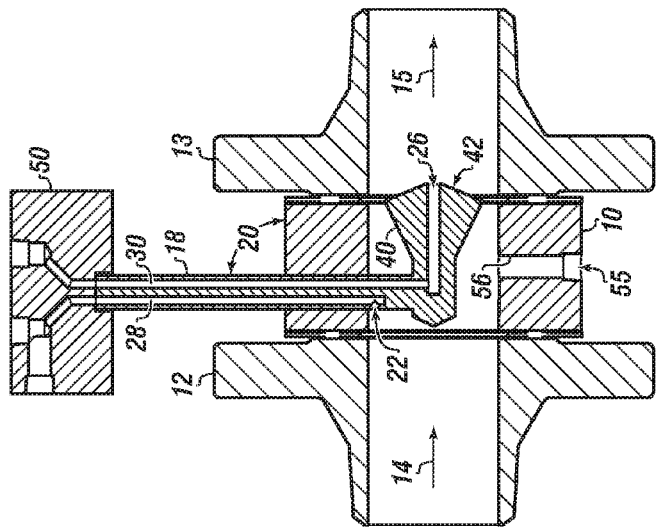
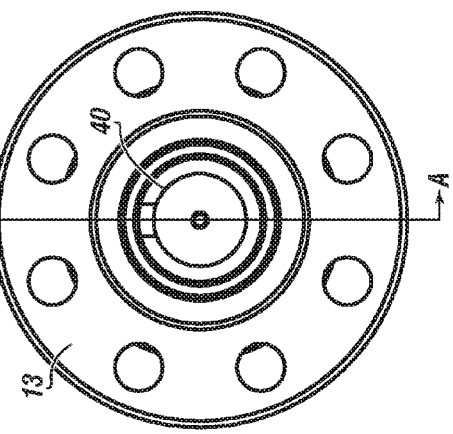
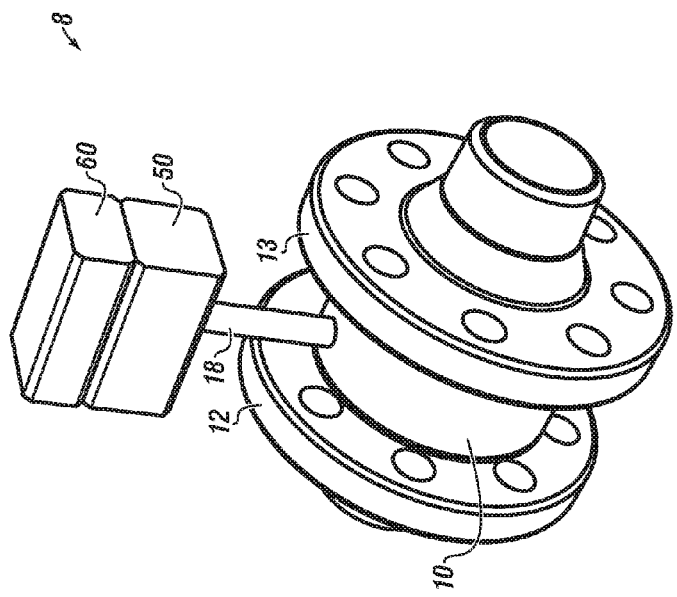

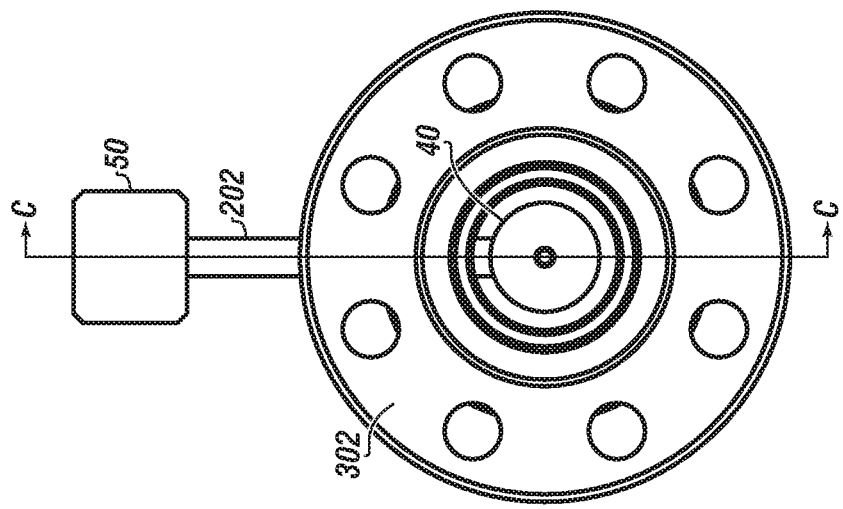
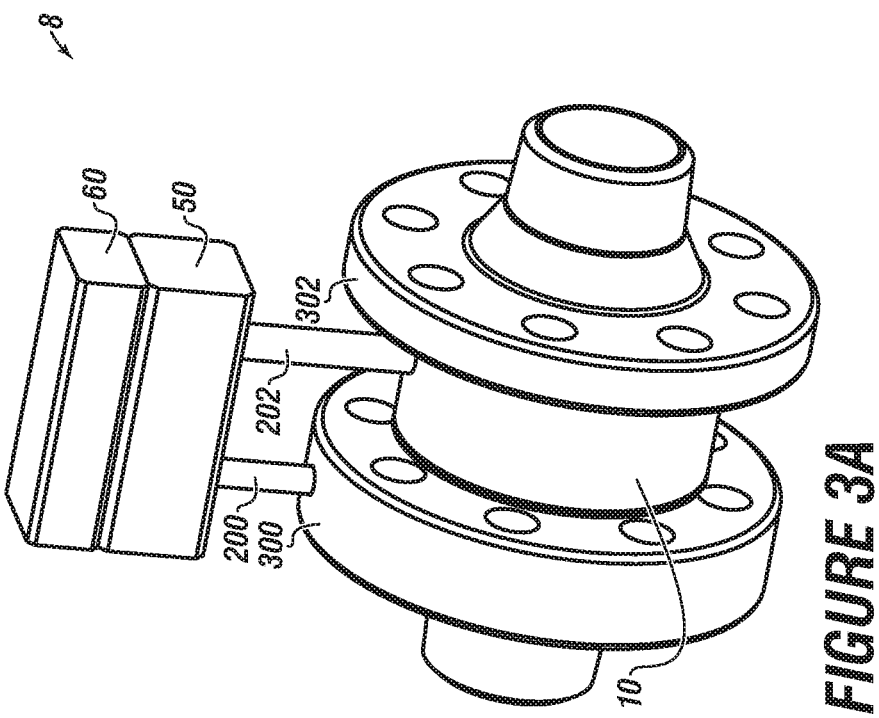

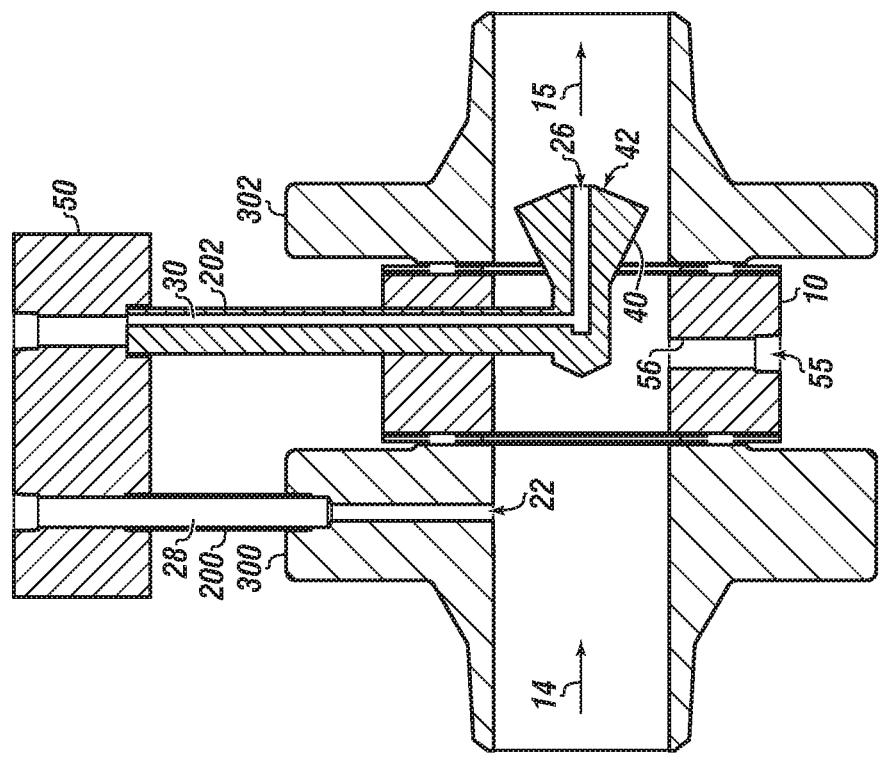

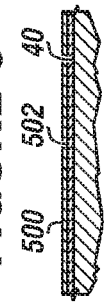
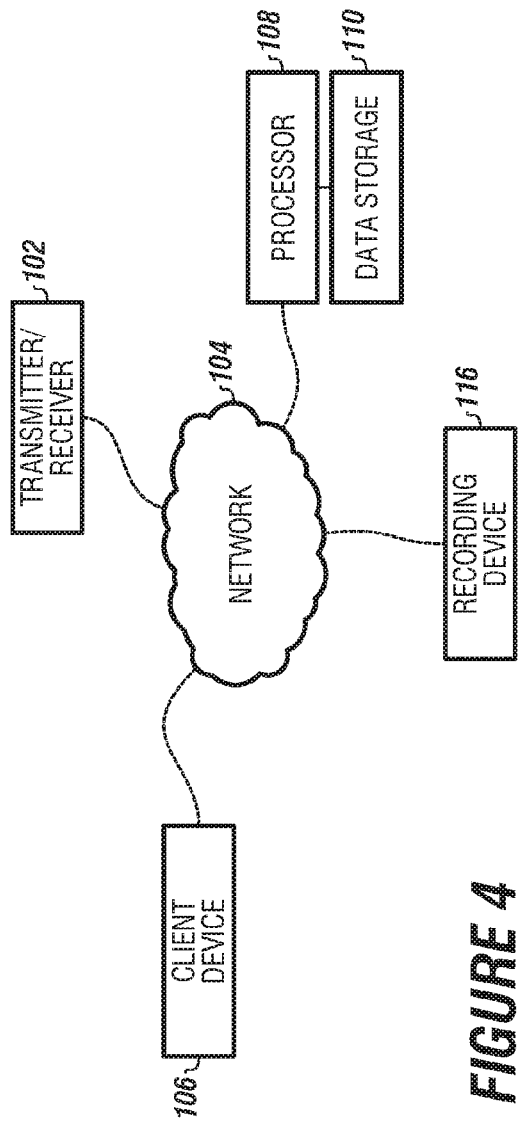
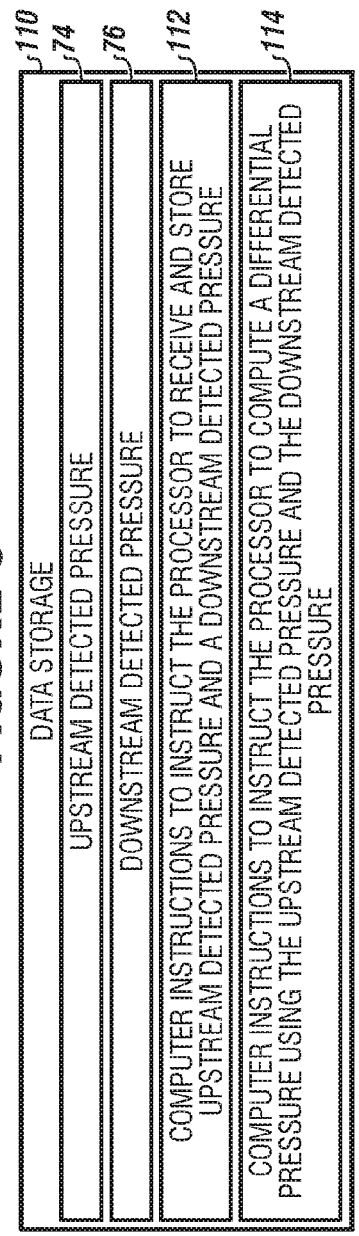

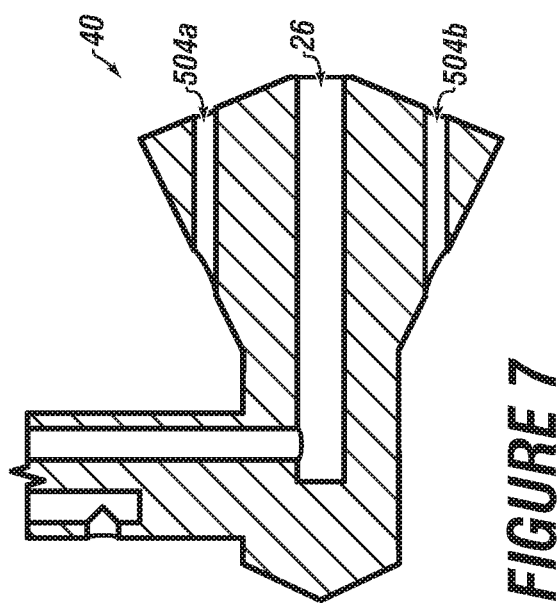

MODULAR REMOVABLE FLOW METERING ASSEMBLY WITH CONE SHAPED DIFFERENTIAL PRESSURE PRODUCER IN A COMPACT FLUID CONDUIT

CROSS REFERENCE TO RELATED APPLICATIONS

The present application claims priority to and the benefit of U.S. Provisional Patent Application Ser. No. 62/353,297 filed on Jun. 22, 2016, entitled "DIFFERENTIAL PRESSURE MEASURING ASSEMBLY." This reference is hereby incorporated in its entirety

FIELD

The present embodiments generally relate to a modular removable flow metering assembly.

BACKGROUND

A need exists for a modular removable flow metering assembly that does not require any special skills for installation.

A further need exists for modular removable flow metering assembly, which has a quick removal, quick disconnect device.

The present embodiments meet these needs.

BRIEF DESCRIPTION OF THE DRAWINGS

The detailed description will be better understood in conjunction with the accompanying drawings as follows:

FIG. 1A shows a perspective view of the modular removable flow metering assembly according to one or more embodiments.

FIG. 1B shows a view of the modular removable flow metering assembly with cut lines A-A according to one or more embodiments.

FIG. 1C shows a cut view of the modular removable flow metering assembly along the cut lines A-A according to one or more embodiments.

FIG. 3A shows a perspective view of the modular removable flow metering assembly according to one or more embodiments.

FIG. 3B shows a view of the modular removable flow metering assembly with cut lines C-C according to one or more embodiments.

FIG. 3C shows a cut view of the modular removable flow metering assembly along the cut lines C-C according to one or more embodiments.

FIG. 4 depicts a customer connection device according to one or more embodiments.

FIG. 5 depicts an exemplary data storage according to one or more embodiments.

FIG. 6 is a cross section of a cone shaped differential pressure producer according to one or more embodiments.

FIG. 7 depicts the cone shaped differential pressure producer with perforations according to one or more embodiments.

Figure 2B:
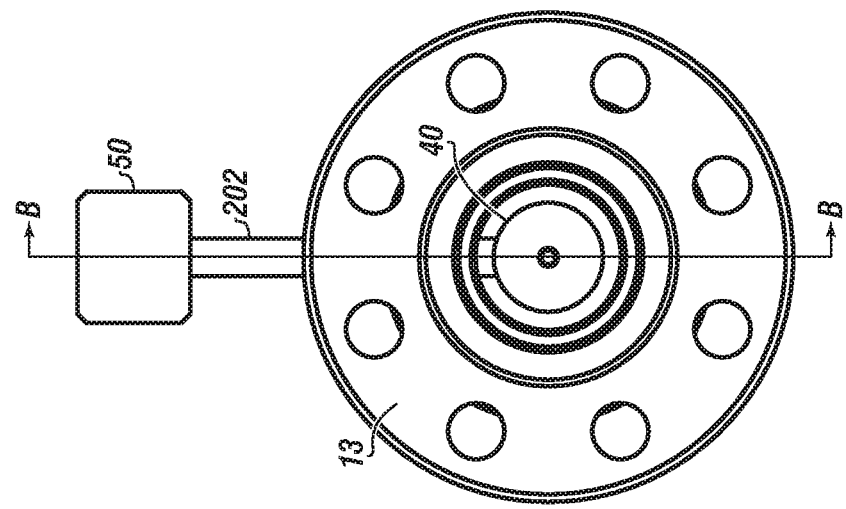
FIG. 2B shows a view of the modular removable flow metering assembly with cut lines B-B according to one or more embodiments.

The present embodiments are detailed below with reference to the listed Figures.

SUMMARY OF THE INVENTION

A modular removable flow metering assembly for a unidirectional fluid channel having three variations. Each embodiment can use a compact fluid conduit for connecting an upstream fluid flow to a downstream fluid flow. An embodiment uses a unitary dual measurement container having an upstream port opening opposite to a downstream port. The upstream port communicates with an upstream fluid channel with an upstream pressure. The downstream port communicates with a downstream fluid channel having a downstream pressure. A cone shaped differential pressure producer with a flared discharge end is in fluid communication with the downstream fluid channel. A manifold can fluidly connect the upstream and downstream fluid channels, and a customer connection device can receive the upstream pressure and downstream pressure.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to a modular removable flow metering assembly. The present embodiments further relate to a differential pressure measuring assembly.

The invention can help eliminate over twenty leak paths from a threaded seal, wherein each leak path can be an explosive opportunity. Eliminating leak paths can prevent severe injury of plant work and field operators.

Environmental spills are significantly reduced because the modular removable flow metering assembly's unitary dual measurement container has limited openings.

A benefit of the modular removable flow metering assembly is that no special skills are required for installation.

Another benefit of the modular removable flow metering assembly is that it is easily removed or reinstalled for repair or maintenance.

A benefit of the modular removable flow metering assembly is that the cone shaped differential pressure producer is configured to provide a pressure velocity that prevents blow back into the compact fluid conduit.

The embodiments relate to a modular removable flow metering assembly for a unidirectional fluid channel having different variations.

Each embodiment can use a compact fluid conduit for connecting an upstream fluid flow to a downstream fluid flow. One embodiment can use a unitary dual measurement container having an upstream port opening opposite to a downstream port. The upstream port can communicate with an upstream fluid channel with an upstream pressure. The downstream port can communicate with a downstream fluid channel having a downstream pressure. A cone shaped differential pressure producer with a flared discharge end can be in fluid communication with the downstream fluid channel. A manifold can fluidly connect the upstream fluid channel, the downstream fluid channel, and a customer connection device for receiving upstream pressure and downstream pressure.

In an embodiment, the modular removable flow metering assembly can support a velocity from 20,000 Reynolds number to 15,000,000 Reynolds number.

In embodiments, the modular removable flow metering assembly can first calculate a calibration factor and then calculate a differential pressure between the upstream port and the downstream port as a function of the calibration factor.

The following terms are used herein:

The term "angle" refers to the angle between the compact fluid conduit and unitary dual measurement container that can range from 30 degrees to 150 degrees and in embodiments the angle can be 90 degrees, 95 degrees, or 85 degrees or another of the degrees in between 30 and 150.

The term "beveled connection" refers to a weld whereby a pipe is welded to the compact fluid conduit of the invention. For this connection, the pipe wall is beveled to join the compact fluid conduit to the pipe.

The term "client device" refers to a bidirectional communication device with a processor and a data storage or computer readable media area to contain sensed data and computer instructions to instruct the processor to perform computations on the sensed data prior to transmission to a network.

The term "compact fluid conduit" refers to a pipe conduit that can be cylindrical. The compact fluid conduit can be made from stainless steel or other high corrosion resistance materials, such as an alloy 20 steel or a non-deforming polymer, such as polyvinyl chloride. High corrosion resistance refers to materials with a Measure of Alloying Resistance to Corrosion (MARC) of 15 or higher. The compact fluid conduit is thick enough to maintain a pressure boundary in a piping system. In an example, the wall thickness can be from one-half inch to six inches, such as four inches. In an example, the length of compact fluid conduit can be from two inches to twelve inches in length.

The term "cone shaped differential pressure producer" refers to a conical cast or machine made metal or durable rigid polymer. The cone shaped differential pressure producer would have a corrosion resistance MARC of 15 or higher.

The term "customer connection device" is a device supplied by a customer for receiving the upstream pressure and the downstream pressure from the manifold. In this invention, it is important that the manifold match the customer connection device in order to have precise measurement of static pressure without leaking.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "downstream port" in the unitary dual measurement container refers to an opening directed at a downstream fluid channel with a downstream pressure side of the compact fluid conduit. The size of the opening can range from $1/16^{th}$ of an inch to $3/8^{th}$ of an inch. The downstream port can be square edged, sharp and without burrs or other machine defects. There is no flow rate into the downstream port; this is a static pressure measurement. The pressure on the downstream side can range from 10 psi to 10,000 psi.

The term "downstream tube" with a downstream fluid channel with a downstream pressure connected to the compact fluid conduit, the downstream fluid channel having a downstream port. The downstream tube can be a conduit which has been drilled or machined or cast to have one port or channel that enable pressure to be measured. The downstream tube is attached to the downstream side of the compact fluid conduit. The downstream tube can be made from stainless steel, alloy 20 steel, or high strength polymer tubing or a reinforced polymer tube that has a diameter from $1/8^{th}$ inch to one and one-half inches.

The term "flared discharge end" can refer to an angle from 21 degrees to 31 degrees. Flaring can occur by increasing the downstream outer diameter in relation to the upstream outer diameter by a ratio of 2:1.

The term "flowing particulate" refers to a solid that is entrained in a fluid which can be a liquid or gas. In an example, a flowing particulate can be sand flowing with oil. Up to 50% particulate can be comingled with a fluid and form a flowing particulate.

The term "manifold" refers to a multichannel conduit that allows for attachment of customer instrumentation while simultaneously connecting to the unitary dual measurement container.

The term "modular removable flow metering assembly" refers to the features of the invention that enable components of the assembly to be easily replaced. The feature "removable" refers to the feature of the invention, which enables the entire unit to be removed from a pipeline and replaced.

The term "mounting flange" refers to a piece integral with a pipeline used to bolt pieces of the pipeline together.

The term "network" refers to a local area network, a wide area network, a satellite network, a global communication network, a cellular network or combinations thereof.

The term "one piece" refers to an invention, wherein all the components of the invention are integrally formed as a one piece unit without being detachable components.

The term "perforations" as used with the cone shaped differential pressure producer can act as relief holes for the device. Between one and six perforations can be used on the cone shaped differential pressure producer. Each perforation can have a diameter ranging from $1/16^{th}$ to $1/8^{th}$ inch.

The term "processor" can refer to a laptop, a computer, a tablet computer, a smart phone, or another device capable of bidirectional communication, processing with non-transitory computer readable media, such as a data storage.

The term "socket weld" refers to a weld whereby a socket is engaged by a pipe and the pipe outer diameter is welded into the socket with a fillet weld.

The term "thermowell" refers to tubular fittings used to protect temperature sensors installed in industrial processes. A thermowell consists of a tube closed at one end and mounted in the process stream. A temperature sensor such as a thermometer, thermocouple or resistance temperature detector is inserted in the open end of the tube, which is usually in the open air outside the process piping or vessel and any thermal insulation. Thermodynamically, the process fluid transfers heat to the thermowell wall, which in turn transfers heat to the sensor.

The term "threaded connection" refers to threads created on the interior of the compact fluid conduit and on the exterior of a pipe enabling the two components to be engaged. In embodiments, the invention can have a threaded connection on one side and a socket weld on the other side. In another embodiment, the invention can have a threaded connection on one side and a mounting flange on the other side. In yet another embodiment of the invention, the threaded connection can be on one side and a mounting flange can be used on an opposite side. Still another embodiment the threaded connection can be used on one side and a beveled connection can be used on the other side. In embodiments, two threaded connection can be used on either side of the compact fluid conduit.

The term "transmitter/receiver" is a device that receives pressure and/or temperature from a sensor installed in the compact fluid conduit and retransmits the detected pressure and/or temperature to a network or a client device.

The term "unitary dual measurement container" refers to a container which has been drilled or machined or cast to have two different ports or channels that enable pressure to be measured to determine a differential in pressure.

The term "upstream port" in the unitary dual measurement container refers to an opening directed at an upstream fluid channel with an upstream pressure side of the compact fluid conduit. The size of the opening can range from $\frac{1}{16}^{th}$ of an inch to $\frac{3}{8}^{th}$ of an inch. The upstream port can be square edged, sharp and without burrs or other machine defects. There is no flow rate into the upstream port; this is a static pressure measurement. The pressure on the upstream side can range from 10 psi to 10,000 psi.

The term "upstream tube" with an upstream fluid channel with an upstream pressure connected to the compact fluid conduit. The upstream fluid channel having an upstream port. The term refers to a conduit which has been drilled or machined or cast to have one port or channel that enable pressure to be measured. The upstream tube is attached to the upstream side of the compact fluid conduit. The upstream tube can be made from stainless steel, alloy 20 steel or high strength polymer tubing or a reinforced polymer tube that has a diameter from $\frac{1}{8}^{th}$ inch to one and a half inches.

Turning now to the Figures, FIGS. 1A-1C depict a modular removable flow metering assembly according to one or more embodiments.

In embodiments, the modular removable flow metering assembly 8 can be used for a unidirectional fluid channel.

The modular removable flow metering assembly 8 can have a compact fluid conduit 10 configured to engage at least one: an upstream mounting flange 12 or a downstream mounting flange 13. The compact fluid conduit 10 can be used for connecting an upstream fluid flow 14 to a downstream fluid flow 15.

The modular removable flow metering assembly 8 can have a unitary dual measurement container 18, which can be connected at an angle 20 to the compact fluid conduit 10. In embodiments, the unitary dual measurement container 18 can be a tube.

In embodiments, the angle 20 can range from 30 degrees to 120 degrees.

The unitary dual measurement container 18 can have an upstream port 22 formed in the unitary dual measurement container 18 opening opposite to a downstream port 26.

The upstream port 22 can communicate with an upstream fluid channel 28 with an upstream pressure in the unitary dual measurement container 18.

The downstream port 26 can communicate with a downstream fluid channel 30 with a downstream pressure.

The modular removable flow metering assembly 8 can have a cone shaped differential pressure producer 40 with a flared discharge end 42, which can be mounted centrally in the compact fluid conduit 10.

In embodiments, the cone shaped differential pressure producer 40 can be a one piece non-clogging unit.

In embodiments, the flared discharge end 42 of the cone shaped differential pressure producer 40 can be positioned centrally in the compact fluid conduit 10 and can extend at least partially from the compact fluid conduit 10.

The cone shaped differential pressure producer 40 can be in fluid communication with the downstream fluid channel 30. It should be noted that the downstream port 26 can be centrally located in the flared discharge end 42.

The modular removable flow metering assembly 8 can have a manifold 50, which can simultaneously connect the upstream fluid channel 28 and the downstream fluid channel 30, wherein the connection can be a fluid connection.

In embodiments, a customer connection device 60 can receive and can store both the upstream pressure and the downstream pressure.

In embodiments the compact fluid conduit can have an opening 55 formed therein and a thermowell 56 can be installed in the opening 55. In embodiments, the thermowell 56 can be in communication with the customer connection device 60.

Figure 2A:
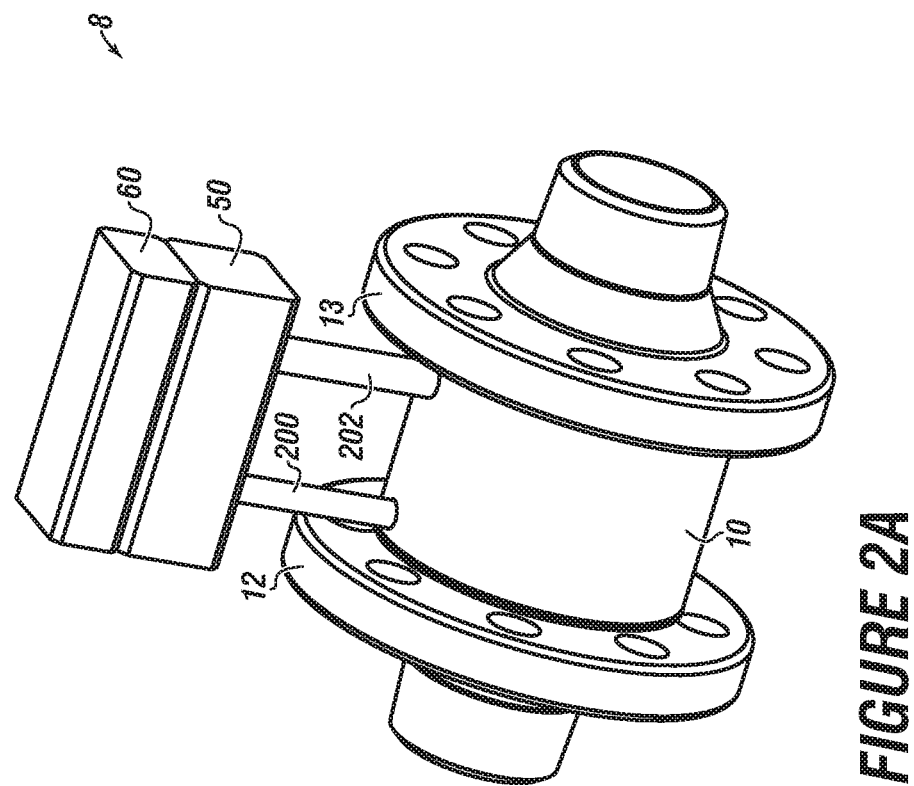
FIG. 2A shows a perspective view of the modular removable flow metering assembly according to one or more embodiments.
Figure 2C:
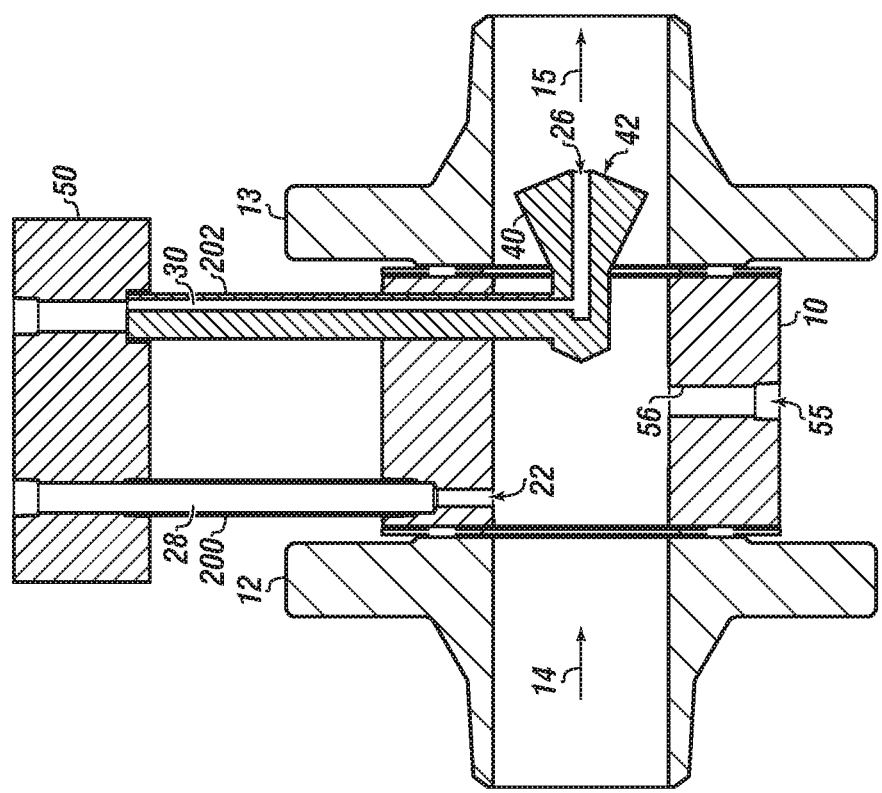
FIG. 2C shows a cut view of the modular removable flow metering assembly along the cut lines B-B according to one or more embodiments.

FIG. 2A-2C depict a modular removable flow metering assembly according to one or more embodiments.

In embodiments, the modular removable flow metering assembly 8 with a compact fluid conduit 10 can be configured to engage at least one of an upstream mounting flange 12 or a downstream mounting flange 13.

The compact fluid conduit 10 can connect an upstream fluid flow 14 to a downstream fluid flow 15.

The modular removable flow metering assembly 8 can have an upstream tube 200 with an upstream fluid channel 28 with an upstream pressure, which can be connected to the compact fluid conduit 10. The upstream fluid channel can have an upstream port 22.

The modular removable flow metering assembly 8 can have a downstream tube 202 with a downstream fluid channel 30 with a downstream pressure, which can be connected to the compact fluid conduit 10. The downstream fluid channel 30 can have a downstream port 26.

The modular removable flow metering assembly 8 can have a cone shaped differential pressure producer 40 with a flared discharge end 42, which can be mounted centrally in the compact fluid conduit 10.

The cone shaped differential pressure producer 40 can be in fluid communication with the downstream fluid channel 30. The downstream port 26 can be centrally located in the flared discharge end 42.

The modular removable flow metering assembly 8 can have a manifold 50, which can simultaneously connect the upstream fluid channel and the downstream fluid channel in fluid communication.

The modular removable flow metering assembly 8 can have a customer connection device 60 for receiving the upstream pressure and the downstream pressure.

In embodiments the compact fluid conduit can have an opening 55 formed therein and a thermowell 56 can be installed in the opening 55. In embodiments, the thermowell 56 can be in communication with the customer connection device 60.

FIG. 3A-3C depict a modular removable flow metering assembly according to one or more embodiments.

In embodiments, a modular removable flow metering assembly 8 can be used for a unidirectional fluid channel.

The modular removable flow metering assembly 8 can have a compact fluid conduit 10 and an upstream control flange 300, which can be mounted concentrically to the compact fluid conduit 10 connecting an upstream fluid flow 14 to the compact fluid conduit 10.

The modular removable flow metering assembly 8 can have a downstream control flange 302, which can be mounted concentrically to the compact fluid conduit 10 connecting the compact fluid conduit to a downstream fluid flow 15.

An upstream tube 200 with an upstream fluid channel 28 having an upstream pressure can be connected to the upstream control flange 300, wherein the upstream fluid channel can have an upstream port 22.

In embodiments, the upstream control flange 300 can have a control flange inner diameter, which can be within 0.1 percent to 1 percent of a compact fluid conduit inner diameter.

A downstream tube 202 with a downstream fluid channel 30 having a downstream pressure can be connected to the compact fluid conduit 10, wherein the downstream fluid channel 30 can have a downstream port 26.

The modular removable flow metering assembly 8 can have a cone shaped differential pressure producer 40 with a flared discharge end 42, which can be mounted centrally in the compact fluid conduit 10. The cone shaped differential pressure producer 40 can be fluid communication with the downstream fluid channel 30 and the downstream port 26 centrally located in the flared discharge end 42.

The modular removable flow metering assembly 8 can have a manifold 50, which can simultaneously connect the upstream fluid channel 28 and the downstream fluid channel 30 in fluid communication and a customer connection device 60 for receiving the upstream pressure and the downstream pressure.

In embodiments the compact fluid conduit can have an opening 55 formed therein and a thermowell 56 can be installed in the opening 55. In embodiments, the thermowell 56 can be in communication with the customer connection device 60.

FIG. 4 depicts a customer connection device according to one or more embodiments.

In embodiments, the customer connection device as previously described can be a transmitter/receiver 102.

The transmitter/receiver 102 can be configured to receive at least one of: an upstream detected pressure, a downstream detected pressure, or both and transmit the upstream detected pressure and the downstream detected pressure to a network 104 or a client device 106.

The network 104 can be any known network, such as a cellular network, a satellite network, a local area network, a wide area network or combinations thereof.

The client device 106 can be a laptop, a computer, a tablet computer, a smart phone, or another device capable of bidirectional communication, processing with non-transitory computer readable media, such as a data storage.

In embodiments, the customer connection device as previously described can be a processor 108 in communication with the network 104, the client device 106, or both the network and the client device.

The processor 108 can be in communication or connection with a data storage 110.

The processor 108 can be a laptop, a computer, a tablet computer, a smart phone, or another device capable of bidirectional communication, processing with non-transitory computer readable media, such as a data storage.

In embodiments, the customer connection device as previously described can be a recording device 116, which can be in communication with the network 104.

The recording device 116 can be configured to receive and store at least one of: the upstream detected pressure, the downstream detected pressure, or both.

FIG. 5 depicts an exemplary data storage according to one or more embodiments.

The processor can have a data storage 110 or be in communication or connection with the data storage. The data storage 110 can contain various computer instructions to instruct the processor to perform various tasks.

The data storage 110 can contain the upstream detected pressure 75 and the downstream detected pressure 76.

The data storage 110 can contain computer instructions 112 to instruct the processor to receive and store the upstream detected pressure and downstream detected pressure.

The data storage 110 can contain computer instructions 114 to instruct the processor to compute a differential pressure using the upstream detected pressure and the downstream detected pressure.

FIG. 6 is a cross section of a one piece non-clogging cone shaped differential pressure producer according to one or more embodiments.

In embodiments, the cone shaped differential pressure producer 40 can have a first material 500, such as high nickel content alloy, on an outside surface and a second material 502, such as stainless steel, on an inside surface.

In embodiments, the first material 500 and the second material 502 can be the same material.

In embodiments, the first material 500 and the second material 502 can have different physical properties. The first material 500 can be a coating from 100 microns to 3000 microns in thickness. The second material 502 can be a coating from 100 microns to 3000 microns in thickness.

FIG. 7 depicts the cone shaped differential pressure producer 40 with perforations according to one or more embodiments.

In embodiments the cone shaped differential pressure producer 40 can have f perforations 504*a*-504*f*, which is an optional feature, which can help improve the flow conditioning performance of the cone shaped differential pressure producer. The perforations can be any opening of any size and shape, such as a slot, a slit, or a hole.

In embodiments, the perforations can be drilled holes through the body of the cone shaped differential pressure producer 40. The perforations can help swirling flow approaching the modular removable flow metering assembly to be "straightened out" or "conditioned" to become more laminar downstream of the cone shaped differential pressure producer.

In embodiments, the fluid for metering is at least one of: a gas, such as natural gas or steam, a liquid, such as water or hydrocarbon based liquids, and a flowing particulate such as silica or sand with an average particle diameter from 10 microns to 3000 microns.

Install Example

To install the modular removable flow metering assembly for a unidirectional fluid channel, the device is removed from its packaging.

Afterwards, the pipe is prepared to accept the modular removable flow metering assembly, by doing one of the following after evaluating the type of connection needed.

For example, the pipe may simply need its threads cleaned in order to accept the modular removable flow metering assembly via a threaded connection. If the pipe needs a mounting flange connection, bolts gaskets and sealing material might be needed to seal the connection after the modular removable flow metering assembly is bolted onto the mounting flange.

If the pipe needs a socket well, the pipe would be cleaned and prepared for insertion into a socket, and welding equipment would be used to make a fillet weld in the a socket weld version.

For preparing the pipe when a beveled connection is needed, the pipe is beveled, cleaned, and then the modular removable flow metering assembly is positioned so that a weld can be made attaching the pipe to the invention.

The portion of the modular removable flow metering assembly that engages the pipe is the compact fluid conduit.

In this example, the compact fluid conduit is five inches and an outer diameter of six inches for connecting an upstream fluid flow to a downstream fluid flow.

In this example, the unitary dual measurement container is connected at a 90 degree angle to the compact fluid conduit.

In this example, the unitary dual measurement container has a ¼ inch upstream port, opening opposite to a ¼ inch downstream port.

The upstream port communicates with an upstream fluid channel with an upstream pressure of 100 psi. The downstream port communicates with a downstream fluid channel with a downstream pressure of 75 psi.

A cone shaped differential pressure producer with a flared discharge end, flared end with a linear change in outer diameter to length of 0.46 to 1 percent of a compact fluid conduit inner diameter, mounted centrally in the compact fluid conduit.

The cone shaped differential pressure producer is in fluid communication with the downstream fluid channel which contains natural gas. The downstream port is centrally located in the flared discharge end.

A 5-valve manifold is fluidly connected to the upstream fluid channel and the downstream fluid channel via separate chambers but provides simultaneous fluid connection to the two streams as well as to a customer connection device. The customer connection device receives the upstream pressure and the downstream pressure from the manifold. The valves can be needle valves in this example.

The customer connection device can be a machined stainless steel manifold that is also 5-valve.

The pressure can be monitored using a multichannel differential pressure transmitter that receives the upstream detected pressure, the downstream detected pressure and transmits the detected pressures to a network or client device, such as a cell phone. In this example, the cell phone has a downloaded application that enables the processor of the cell phone to receive and store the upstream detected pressure and the downstream detected pressure and computer instructions to instruct the processor to compute a differential pressure using the upstream detected pressure and the downstream detected pressure.

Example—Upstream and Downstream Tube with Monitoring

After prepping the pipe as described above, the compact fluid conduit is connected to the pipe.

In this example, upstream tube with an upstream fluid channel and an upstream pressure is connected at a 90 degree angle to the compact fluid conduit and the manifold.

Stainless steel tubing can be used for the upstream tube that is six inches in length, with an outer diameter of $\frac{3}{8}^{th}$ inch. The upstream fluid channel has an upstream port that is inch.

Stainless steel tubing can be used for the downstream tube that is also six inches in length with an outer diameter of $\frac{3}{8}^{th}$ inch. The downstream fluid channel is connected to the compact fluid conduit; the downstream fluid channel has a downstream port that is also ¼ inch in diameter.

A cone shaped differential pressure producer with a flared discharge end, flared end with a linear change in outer diameter to length of 0.46 to 1 percent of a compact fluid conduit inner diameter is mounted centrally in the compact fluid conduit.

The cone shaped differential pressure producer is in fluid communication with the downstream fluid channel which contains natural gas. The downstream port is centrally located in the flared discharge end.

A 3-valve manifold is fluidly connected to the upstream fluid channel and the downstream fluid channel via separate chambers but provides simultaneous fluid connection to the two streams as well as to a customer connection device. The customer connection device receives the upstream pressure and the downstream pressure from the manifold. The valves can be needle valves in this example.

A customer connection device for receiving the upstream pressure and the downstream pressure can be stainless steel tubing with an outer diameter of $\frac{3}{8}^{th}$ inch.

The pressure can be monitored using a multichannel differential pressure transmitter that receives the upstream detected pressure, the downstream detected pressure and transmits the detected pressures to a network or client device, such as a plant control system (DCS) for natural gas measurement.

In this example, the plant control system receives and stores the upstream detected pressure and the downstream detected pressure and makes calculations converting those pressure readings into measurements of flow rates. The plant control system with processor uses that data to open and close control valves and other control equipment in the plant to prevent explosions and stop death of plant operators.

While these embodiments have been described with emphasis on the embodiments, it should be understood that within the scope of the appended claims, the embodiments might be practiced other than as specifically described herein.

What is claimed is:

1. A modular removable flow metering assembly for a unidirectional fluid channel comprising:
   a. a flangeless compact fluid conduit configured to engage an upstream mounting flange and a downstream mounting flange of an existing pipe the flangeless compact fluid conduit for connecting an upstream fluid flow to a downstream fluid flow;
   b. a unitary dual measurement container connected at an angle to the compact fluid conduit, the unitary dual measurement container having an upstream port formed therein, opening opposite to a downstream port, the upstream port communicating with an upstream fluid channel with an upstream pressure, the downstream port with a downstream pressure communicating with a downstream fluid channel, the downstream fluid channel being separate from the upstream fluid channel within the unitary dual measurement container for determining differential pressure in the unitary dual measurement container;
   c. a cone shaped differential pressure producer with a flared discharge end mounted centrally in the compact fluid conduit, the cone shaped differential pressure producer in fluid communication with the downstream fluid channel, the downstream port centrally located in the flared discharge end, and wherein the flared discharge end is positioned centrally in the compact fluid conduit and extends at least partially beyond the compact fluid conduit into the existing pipe;

d. a manifold fluidly connecting the upstream fluid channel and the downstream fluid channel; and e. a customer connection device for receiving the upstream pressure and the downstream pressure from the manifold.

2. The modular removable flow metering assembly of claim 1, wherein the cone shaped differential pressure producer comprises a first material on an outside surface of the cone shaped differential pressure producer and a second material on an inside surface of the cone shaped differential pressure producer, wherein the first material and the second material have different physical properties.

3. The modular removable flow metering assembly of claim 1, further comprising perforations in the cone shaped differential pressure producer.

4. The modular removable flow metering assembly of claim 1, further comprising an opening formed in the compact fluid conduit with a thermowell installed in the opening, the thermowell having a temperature sensor.

5. The modular removable flow metering assembly of claim 1, wherein the fluid for metering is at least one of: a gas, a liquid, or a flowing particulate.

6. The modular removable flow metering assembly of claim 1, wherein the angle of the cone shaped differential pressure producer to the compact fluid conduit ranges from 30 degrees to 120 degrees.

7. The modular removable flow metering assembly of claim 1, wherein the cone shaped differential pressure producer is a one piece unit.

8. The modular removable flow metering assembly of claim 1, wherein the customer connection device is at least one of:

a. a transmitter/receiver configured to receive: an upstream detected pressure and a downstream detected pressure and transmit the upstream detected pressure and the downstream detected pressure to a network or a client device; and b. a processor in communication with the network or the client device that communicates with a data storage, the data storage containing computer instructions to instruct the processor to receive and store the upstream detected pressure and the downstream detected pressure and computer instructions to instruct the processor to compute a differential pressure using the upstream detected pressure and the downstream detected pressure.

9. The modular removable flow metering assembly of claim 8, comprising a recording device in communication with the network configured to receive and store at least one of: the upstream detected pressure and the downstream detected pressure.

* * * * *